(12) United States Patent
Minobe

(10) Patent No.: US 9,864,318 B2
(45) Date of Patent: Jan. 9, 2018

(54) IMAGE FORMING APPARATUS INCLUDING A POWER SUPPLY FOR FORMING AN IMAGE ON A RECORDING MATERIAL

(71) Applicant: CANON KABUSHIKI KAISHA, Tokyo (JP)

(72) Inventor: Taro Minobe, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/660,783

(22) Filed: Mar. 17, 2015

(65) Prior Publication Data

US 2015/0268616 A1 Sep. 24, 2015

(30) Foreign Application Priority Data

Mar. 20, 2014 (JP) ................................ 2014-058498

(51) Int. Cl.
*G03G 15/16* (2006.01)
*G03G 15/00* (2006.01)
*H02M 3/335* (2006.01)
*H02M 1/00* (2006.01)

(52) U.S. Cl.
CPC ........ *G03G 15/80* (2013.01); *H02M 3/33561* (2013.01); *H02M 2001/0009* (2013.01); *H02M 2001/0077* (2013.01)

(58) Field of Classification Search
CPC .................................................... G03G 15/08
USPC ..................................................... 399/88, 66
See application file for complete search history.

(56) References Cited

U.S. PATENT DOCUMENTS

| 5,339,144 A * | 8/1994 | Nakai | G03G 15/6535 |
| | | | 361/214 |
| 6,552,447 B1 * | 4/2003 | Fuse | G03G 15/80 |
| | | | 307/68 |
| 2013/0064565 A1 * | 3/2013 | Yasukawa | H02M 7/103 |
| | | | 399/88 |

FOREIGN PATENT DOCUMENTS

| JP | S60089734 U | 6/1985 |
| JP | 02-16659 A | 1/1990 |
| JP | 11-95581 A | 4/1999 |
| JP | H11-125979 A | 5/1999 |
| JP | 2002103738 A | 4/2002 |
| JP | 2002-372874 A | 12/2002 |
| JP | 2007127949 A | 5/2007 |
| JP | 2010113224 A | 5/2010 |
| JP | 2013-078252 A | 4/2013 |

* cited by examiner

*Primary Examiner* — Quana M Grainger
(74) *Attorney, Agent, or Firm* — Canon USA, Inc., IP Division

(57) ABSTRACT

An imaging forming apparatus includes a positive high-voltage circuit that generates voltage having a positive polarity, a negative high-voltage circuit connected in series with the positive high-voltage circuit and generates voltage having a negative polarity, a transfer roller to which the voltage generated by the positive high-voltage circuit or the negative high-voltage circuit is supplied, neutralizing pins to which the voltage generated by the negative high-voltage circuit is supplied, a current detection circuit that detects current flowing into the transfer roller, and a diode connected between the transfer roller and the neutralizing pins and that separates a path for the current flowing into the transfer roller and a path for current flowing into the neutralizing pins from each other.

22 Claims, 11 Drawing Sheets

IMAGE FORMING APPARATUS INCLUDING A POWER SUPPLY FOR FORMING AN IMAGE ON A RECORDING MATERIAL

BACKGROUND

Field

Aspects of the present invention generally relate to a power supply device and an image forming apparatus.

Description of the Related Art

An image forming apparatus adopting an electrophotographic method includes a high-voltage power supply device, which is essential to a process for forming an image on a recording material. As the high-voltage power supply device, for example, one of various modular power supplies such as a charging high-voltage power supply, a developing high-voltage power supply, and a transfer high-voltage power supply is used. These power supplies have different specifications in accordance with the configuration of the image forming apparatus. For example, voltage of an alternating-current high-voltage power supply is superimposed upon voltage of a direct-current high-voltage power supply, or voltage of a direct-current positive high-voltage power supply is superimposed upon voltage of a direct-current negative high-voltage power supply. In addition, various specifications are also possible in terms of specified voltage, specified current, a constant current control method, a constant voltage control method, single-valued output, multi-level value control output, load conditions, and the like.

For example, in the case of transfer voltage, the resistance of a transfer member is measured and the transfer voltage is appropriately controlled in accordance with a result of the measurement, in order to apply, to the transfer member, current necessary to transfer an image. One of various methods for appropriately controlling transfer voltage is an automatic transfer voltage control (ATVC) method disclosed in Japanese Patent Laid-Open No. 11-95581. In the ATVC method, constant voltage control or constant current control is performed on the transfer member using a predetermined value (hereinafter referred to as a "target value") in a non-image region or between recording sheets, and current or voltage applied to the transfer member at this time is detected. Voltage applied to the transfer member when an image is formed is then controlled based on a result obtained by arithmetically processing the detected voltage or current. Even if the control adopting the ATVC method causes a change in the characteristics of the transfer member due to a change in a surrounding environment of the transfer member or another factor, appropriate current for transferring a toner image can be supplied.

On the other hand, in an operation for cleaning the image forming apparatus, voltage having a polarity opposite that of voltage usually used needs to be applied. For example, in Japanese Patent Publication No. 2-16659, an image forming apparatus is proposed in which voltage having a polarity opposite that of voltage used for transfer is applied to a transfer member and toner left on a surface of a transfer roller is transferred onto an image bearing member using static electricity, in order to remove toner left on the transfer member. In addition, for example, in Japanese Patent Laid-Open No. 2013-78252, voltage having a polarity opposite that of voltage usually used is applied to a secondary transfer roller and a belt cleaning member during a cleaning operation in a configuration including an intermediate transfer member. In this example of the related art, an image forming apparatus is proposed in which toner is prevented from being left on a transfer member and toner that has not been transferred onto a recording material and left on the intermediate transfer member is transferred onto a photosensitive drum and collected.

In addition, in order to separate a recording material from an image bearing member, a transfer roller, or an intermediate transfer member, for example, an electricity eliminating device such as neutralizing pins might be provided. For example, in Japanese Patent Laid-Open No. 2002-372874, an image forming apparatus is proposed in which an electricity eliminating device including a corona discharge unit is provided downstream in a conveying direction of a recording material, and charged particles generated through corona discharge are emitted onto the recording material immediately after the recording material is discharged from a transfer unit.

Currently, further reductions in the size and costs of the image forming apparatus are desired. A high-voltage power supply device included in an image forming apparatus in an example of the related art, an independent high-voltage power supply is provided for each voltage to be applied, such as charging voltage, developing voltage, transfer voltage, or neutralizing voltage. As a result of provision of a large number of components, costs and the area of a circuit board increase. Therefore, the size and costs of the high-voltage power supply device need to be reduced. On the other hand, if a plurality of high-voltage power supplies are integrated with one another, current needs to be accurately detected, in order to make appropriate current flow when an image is formed.

SUMMARY

According to aspects of the present invention, the size and cost of a power supply device is reduced while maintaining a function of accurately detecting current.

A power supply device that supplies voltage to a first member and a second member, the power supply apparatus comprising a first circuit configured to generate voltage having a certain polarity, a second circuit that is connected in series with the first circuit and configured to generate voltage having a polarity opposite the certain polarity, a detection circuit configured to supply the voltage generated by the first circuit or the second circuit to the first member, supply the voltage generated by the second circuit to the second member, and detect current flowing into the first member, and a separation device connected between the first member and the second member and configured to separate a path for the current flowing into the first member and a path for current flowing into the second member from each other.

Further features of the present disclosure will become apparent from the following description of exemplary embodiments with reference to the attached drawings.

DESCRIPTION OF THE EMBODIMENTS

Exemplary embodiments will be described in detail hereinafter with reference to the drawings.

First Embodiment (1) Configuration of Image Forming Apparatus

Figure 1A:
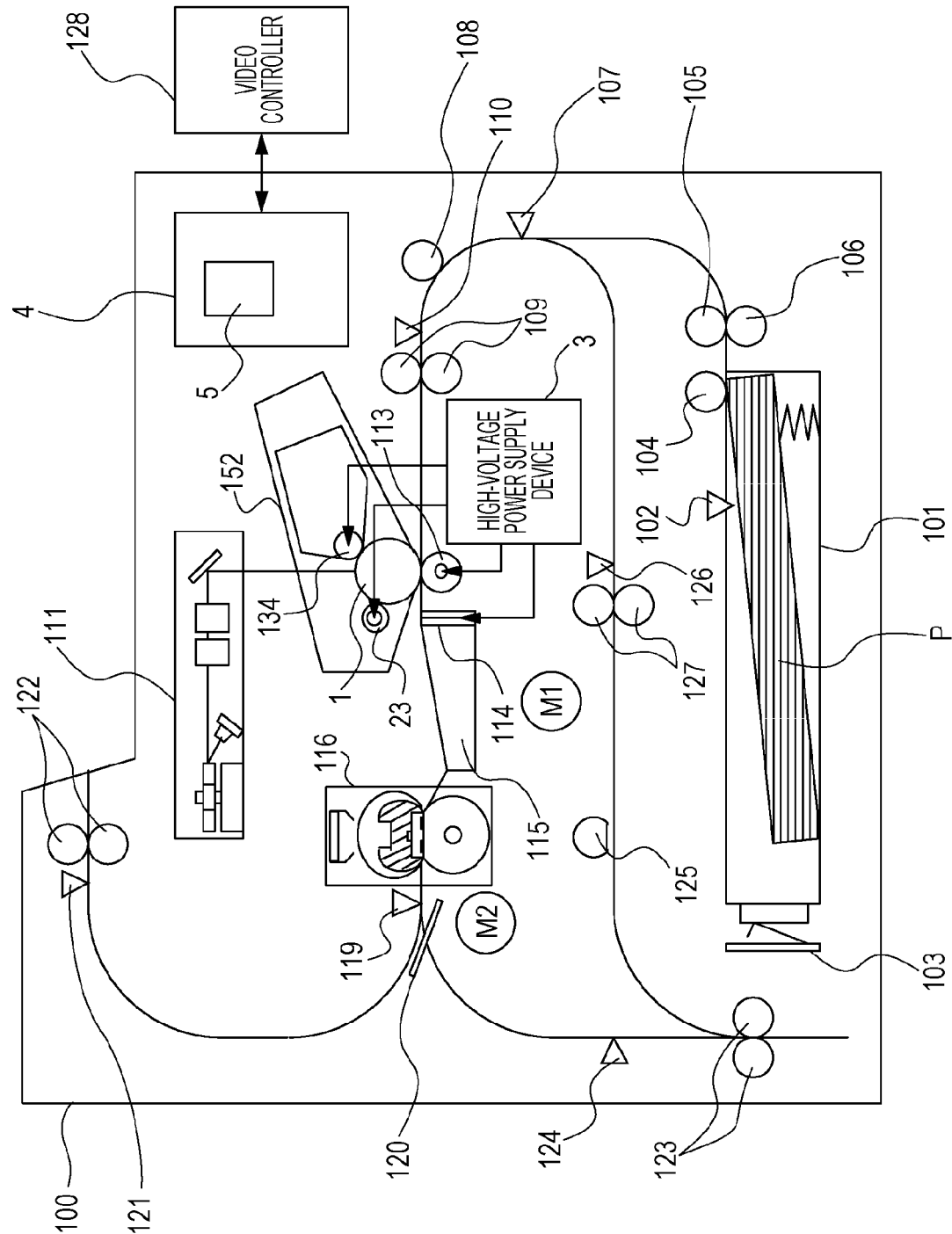
FIGS. 1A and 1B are diagram illustrating the configurations of image forming apparatuses according to a first and a third embodiment, respectively.

FIG. 1A is a diagram illustrating the configuration of an image forming apparatus 100 according to a first embodiment. The image forming apparatus 100 includes a deck 101, which is a storage unit that stores a recording material P, which is recording sheets. The image forming apparatus 100 also includes a paper presence sensor 102 that detects presence or absence of the recording material P in the deck 101 and a paper size detection sensor 103 that detects the size of the recording material P in the deck 101. The image forming apparatus 100 also includes a pickup roller 104 that feeds the recording material P to a conveying path from the deck 101 and a feed roller 105 that conveys the recording material P fed by the pickup roller 104. The image forming apparatus 100 also includes a retard roller 106 that faces the feed roller 105 and that prevents simultaneous feeding of a plurality of sheets. The image forming apparatus 100 also includes, downstream of the feed roller 105 in a conveying direction, a feed sensor 107 that detects a conveying state of the recording material P from the deck 101 or a duplex reversal unit, which will be described later. The image forming apparatus 100 also includes a conveying roller 108 that conveys the recording material P further downstream and a registration roller pair 109 that conveys the recording material P synchronously with a printing timing. The image forming apparatus 100 also includes a pre-registration sensor 110 that detects the conveying state of the recording material P prior to the registration roller pair 109.

A process cartridge 152 that emits laser light from a laser scanner unit 111 on the basis of image information transmitted from a video controller 128 in order to form a toner image on a photosensitive drum 1 is provided downstream of the registration roller pair 109 in the conveying direction. A transfer roller 113, which is a transfer device (first member) for transferring the toner image formed on the photosensitive drum 1 onto the recording material P, faces the photosensitive drum 1, which is an image bearing member. In addition, neutralizing pins 114, which constitute an electricity eliminating device (second member) for prompting separation of the recording material P from the photosensitive drum 1 by removing charge on the recording material P, are provided on a side of the conveying path opposite the photosensitive drum 1. Furthermore, a conveying guide 115, a fusing unit 116, a fusing discharge sensor 119, and a switching flapper 120 are provided downstream of the neutralizing pins 114 in the conveying direction. The fusing unit 116 fuses the toner image transferred onto the recording material P. The fusing discharge sensor 119 detects the conveying state of the recording material P that has passed through the fusing unit 116. The switching flapper 120 switches a destination of the recording material P conveyed from the fusing unit 116 between a discharge unit and the duplex reversal unit.

A discharge sensor 121 that detects the conveying state of the recording material P in the discharge unit and a discharge roller pair 122 that discharges the recording material P from the image forming apparatus 100 are provided downstream in the discharge unit. On the other hand, the duplex reversal unit reverses the recording material P after printing on a side of the recording material P is completed, in order to convey the recording material P to an image forming unit again and perform printing on another side of the recording material P. In the duplex reversal unit, a reversing roller pair 123, a reversal sensor 124, a D-shaped roller 125, a duplex sensor 126, and a duplex conveying roller pair 127 are provided. The reversing roller pair 123 reverses the conveying direction of the recording material P along the conveying path. The reversal sensor 124 detects the conveying state of the recording material P prior to the reversing roller pair 123. The D-shaped roller 125 is a roller for conveying the recording material P from a lateral registration unit, which is not illustrated, for aligning the position of the recording material P in a width direction. Here, the width direction of the recording material P refers to a direction (this is also a main scanning direction) perpendicular to the conveying direction of the recording material P. The duplex sensor 126 detects the conveying state of the recording material P in the duplex reversal unit. The duplex conveying roller pair 127 is a pair of rollers for conveying the recording material P to a feed unit from the duplex reversal unit. A high-voltage power supply device 3 is a device that generates voltage used in an electrophotographic process. For example, the high-voltage power supply device 3 applies high voltage to a charger 23, a developing roller 134, the transfer roller 113, the neutralizing pins 114, and the like. A microprocessor unit (MPU) 5 incorporated into an engine controller 4 controls the image forming apparatus 100 according to this embodiment.

(2) Transfer Unit

Figure 2:
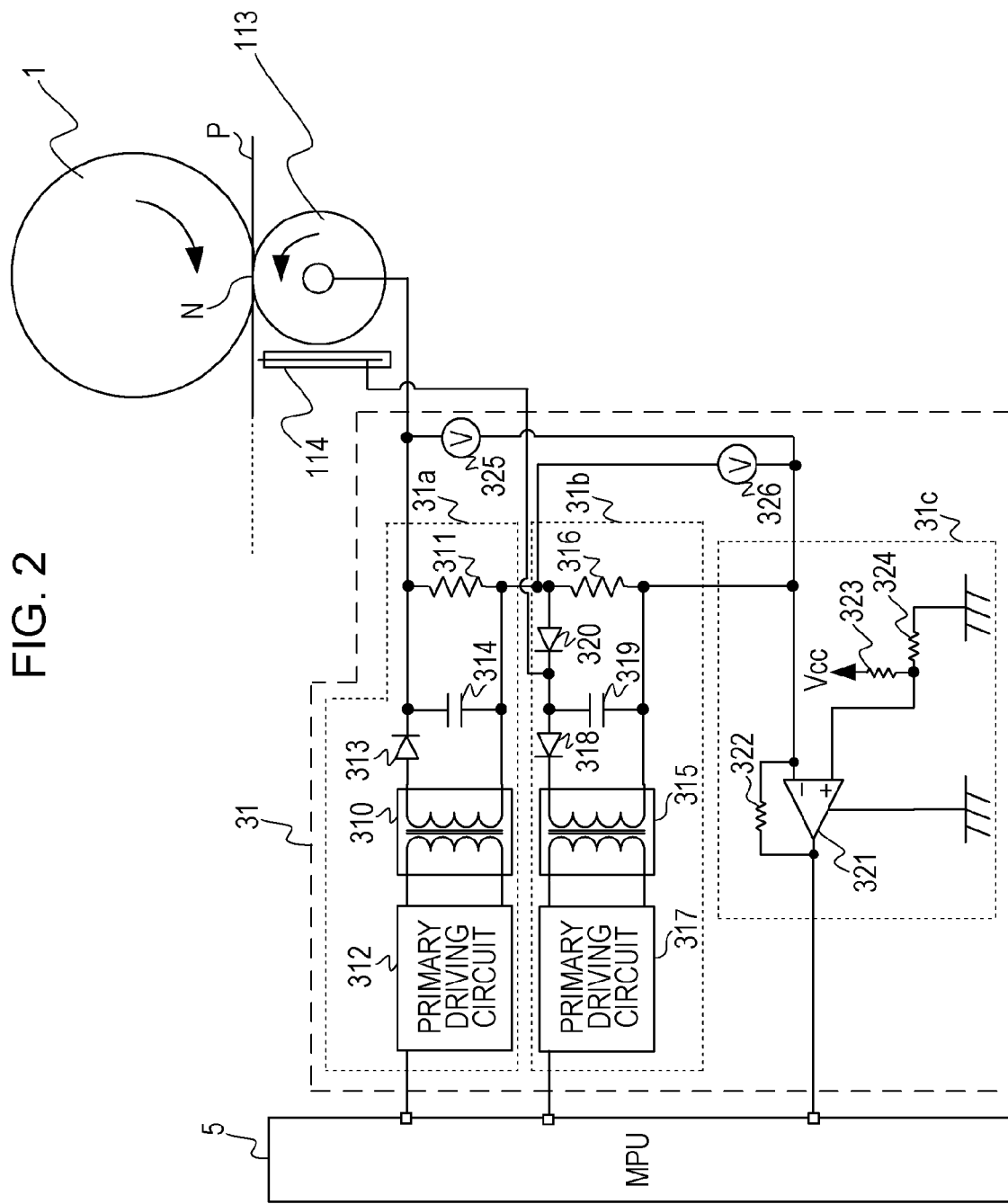
FIG. 2 is a diagram illustrating the configurations of a transfer device and a transfer power supply according to the first embodiment.

The configuration of the transfer device that transfers a toner image formed on the photosensitive drum 1 onto the recording material P will be described. FIG. 2 illustrates the configurations of the transfer device and a transfer power supply according to this embodiment. The transfer roller 113 is pressed against the photosensitive drum 1 by a pressure spring, which is not illustrated, at a certain pressure to form a transfer nip N. The transfer roller 113 transfers the toner image on a surface of the photosensitive drum 1 onto the recording material P at the transfer nip N between the photosensitive drum 1 and the transfer roller 113 using transfer voltage applied from a common voltage generation circuit 31 (indicated by broken lines). The potential of the transfer voltage applied to the transfer roller 113 from the common voltage generation circuit 31 has a polarity opposite a charging polarity of the toner image. The transfer roller 113 is a solid roller including a metal roller, which is composed of, for example, iron or steel use stainless (SUS), covered by rubber or a rubber roller in which an elastic layer, which is composed of, for example, foam sponge, having moderate resistance is formed.

Next, the neutralizing pins 114 are arranged on a side of the transfer nip N on which the recording material P is discharged, that is, downstream of the transfer roller 113 in the conveying direction of the recording material P. The neutralizing pins 114 removes charge on the recording material P (hereinafter simply referred to as "neutralizes the recording material P") that has passed through the transfer nip N using voltage (hereinafter referred to as "neutralizing voltage") for removing charge, the neutralizing voltage being applied from the common voltage generation circuit 31. The potential of the neutralizing voltage applied to the neutralizing pins 114 from the common voltage generation circuit 31 is opposite that of the transfer voltage applied to the transfer roller 113. The neutralizing pins 114 separate the recording material P electrostatically attracted to the photosensitive drum 1.

The common voltage generation circuit 31 is a circuit that generates voltages and applies certain voltages to the transfer roller 113 and the neutralizing pins 114. The common voltage generation circuit 31 is mounted inside the high-voltage power supply device 3 (FIG. 1A). The internal configuration of the common voltage generation circuit 31 will be described later.

(3) Outline of Common Voltage Generation Circuit

One of the characteristics of this embodiment is that the neutralizing voltage necessary for the image forming apparatus 100 is supplied from the transfer power supply including a current detection circuit and current paths are separated from each other by a diode 320 so that detection of current performed by the transfer power supply is not affected. The common voltage generation circuit 31 includes a negative high-voltage circuit 31b, a positive high-voltage circuit 31a, and a current detection circuit 31c. The positive high-voltage circuit 31a generates transfer positive voltage having a positive polarity. The transfer positive voltage is output in order to transfer a toner image on the photosensitive drum 1 onto the recording material P by applying, to the recording material P, charge having a polarity (positive polarity) opposite that of the toner image. The negative high-voltage circuit 31b generates transfer negative voltage having a negative polarity and negative neutralizing voltage having a negative polarity. The transfer negative voltage is output in order to remove toner left on a surface of the transfer roller 113 by collecting the toner using the photosensitive drum 1 after a toner image is transferred onto the recording material P. The neutralizing voltage is output in order to neutralize the recording material P that has passed through the transfer nip N. The current detection circuit 31c detects current output from the positive high-voltage circuit 31a. The configuration of the current detection circuit 31c will be described later.

Negative High-Voltage Circuit

The configuration of the negative high-voltage circuit 31b will be described hereinafter. In FIG. 2, the negative high-voltage circuit 31b, which is a second circuit, includes a step-up transformer 315, a primary driving circuit 317 that drives the step-up transformer 315 in accordance with a control signal from the MPU 5, and a rectification device (318 and 319). The step-up transformer 315 includes a primary coil and a secondary coil and, when the primary driving circuit 317, which includes a switching device, supplies alternating-current power to the primary coil, generates alternating-current high voltage in the secondary coil. A diode 318 and a high-voltage capacitor (hereinafter simply referred to as a "capacitor") 319, which constitute the rectification device, rectify the alternating-current high voltage generated in the secondary coil of the step-up transformer 315 as negative direct-current high voltage. Here, a resistor 316 is a bleeder resistor of the negative high-voltage circuit 31b. A voltage detection circuit 326 divides the direct-current high voltage from the negative high-voltage circuit 31b and feeds resultant voltage back (not illustrated) to the MPU 5. The MPU 5 performs constant voltage control on the negative high-voltage circuit 31b on the basis of the feedback from the voltage detection circuit 326. A cathode of the diode 320 is connected to the neutralizing pins 114 and supplies the negative direct-current high voltage from the negative high-voltage circuit 31b to the neutralizing pins 114. On the other hand, an anode of the diode 320 is connected to the transfer roller 113 through a resistor 311 and supplies the negative direct-current high voltage from the negative high-voltage circuit 31b to the transfer roller 113 through the resistor 311.

Current Paths of Negative High-Voltage Circuit

Figure 3A:
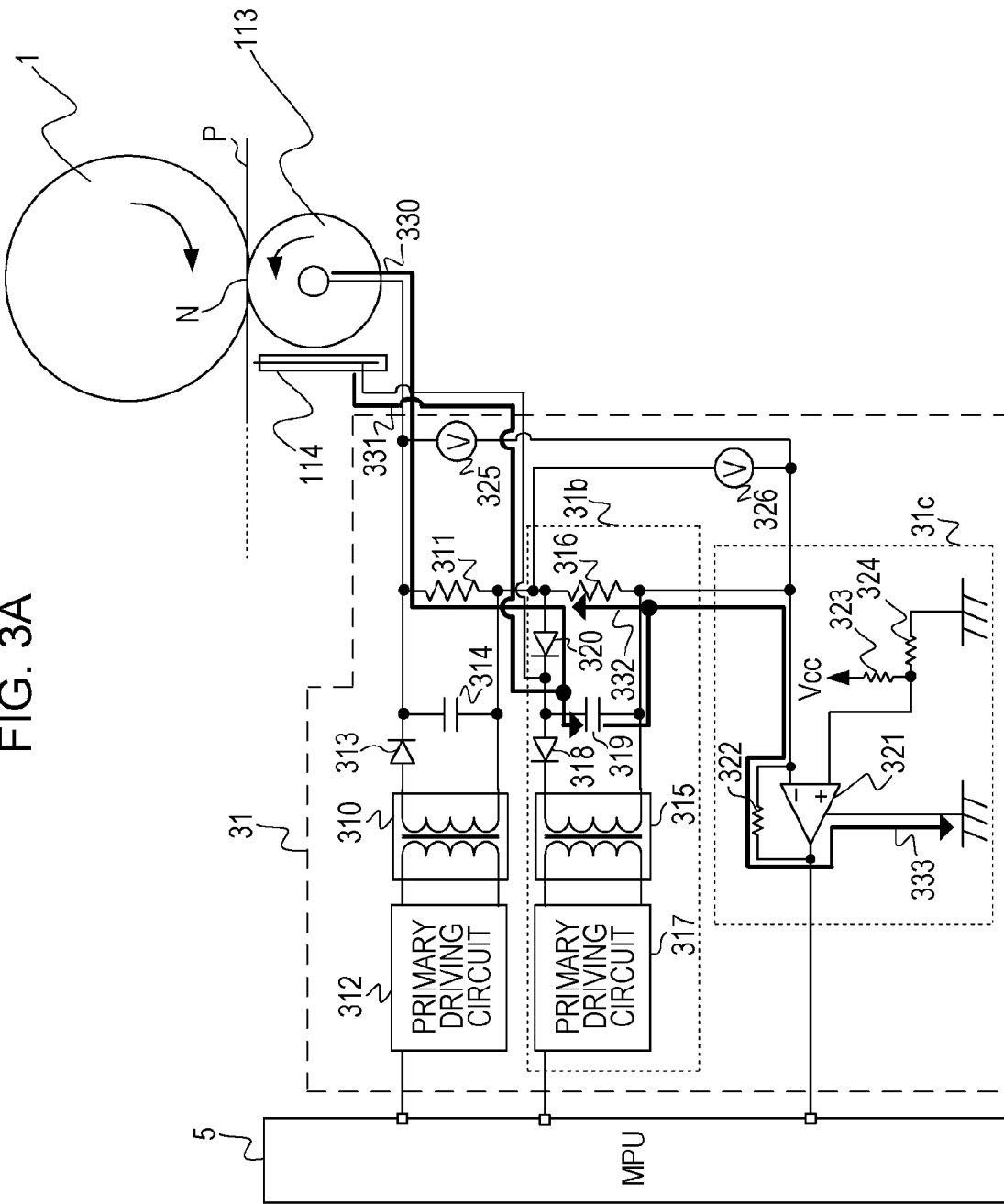
FIGS. 3A and 3B are diagrams illustrating current paths from a transfer voltage generation circuit and a neutralizing voltage generation circuit according to the first embodiment.

FIG. 3A is a diagram illustrating current paths of the negative high-voltage circuit 31b. In FIG. 3A, an output of the positive high-voltage circuit 31a is stopped, that is, in an off state, and an output of the negative high-voltage circuit 31b is in an on state. If the output of the negative high-voltage circuit 31b is in the on state, negative current flows into the transfer roller 113 and the neutralizing pins 114. Current paths established when the negative high-voltage circuit 31b applies the transfer negative voltage having a negative polarity to the transfer roller 113 are paths 330 and 333. The path 330 is a path through which negative current from a ground (hereinafter referred to as a "GND") (not illustrated) of the photosensitive drum 1 reaches the negative high-voltage circuit 31b (capacitor 319) through the recording material P, the transfer roller 113, the resistor 311, and the diode 320. The path 333 is a path through which current from the negative high-voltage circuit 31b (capacitor 319) reaches a GND of the current detection circuit 31c through a resistor 322 and an operational amplifier 321 of the current detection circuit 31c.

Current paths established when the negative high-voltage circuit 31b applies the negative neutralizing voltage to the neutralizing pins 114 are paths 331 and 333. The path 331 is a path through which negative current from the GND (not illustrated) of the photosensitive drum 1 reaches the negative high-voltage circuit 31b (capacitor 319) through the recording material P and the neutralizing pins 114. The path 333 is the same as when the negative high-voltage circuit 31b applies the transfer negative voltage having a negative polarity to the transfer roller 113, and accordingly description thereof is omitted. In addition, a path 332 is a current path through which current does not flow into processing members such as the transfer roller 113 and the neutralizing pins 114. Through the path 332, negative current from the negative high-voltage circuit 31b (capacitor 319) returns to the negative high-voltage circuit 31b through the resistor 316.

Positive High-Voltage Circuit

The configuration of the positive high-voltage circuit 31a will be described hereinafter. In FIG. 2, the positive high-voltage circuit 31a, which is a first circuit, includes, as with the negative high-voltage circuit 31b, a step-up transformer 310, a primary driving circuit 312, and a rectification device (313 and 314). The step-up transformer 310 includes a primary coil and a secondary coil and, when the primary driving circuit 312, which includes a switching device, supplies alternating-current power to the primary coil, generates alternating-current high voltage in the secondary coil. A diode 313 and a high-voltage capacitor (hereinafter simply referred to as a "capacitor") 314, which constitute the rectification device, rectify the alternating-current high voltage generated in the secondary coil of the step-up transformer 310 as positive direct-current high voltage. Here, the resistor 311 is a bleeder resistor of the positive high-voltage circuit 31a. The negative high-voltage circuit 31b and the positive high-voltage circuit 31a are connected in series with each other, and the direct-current high voltage generated thereby are supplied to the transfer roller 113 through the bleeder resistors 316 and 311, respectively. A voltage detection circuit 325 divides the direct-current high voltage applied to the transfer roller 113 and feeds resultant voltage back (not illustrated) to the MPU 5. The MPU 5 performs constant voltage control on the positive high-voltage circuit 31a on the basis of the feedback from the voltage detection circuit 325.

Current Paths of Positive High-Voltage Circuit

Figure 3B:
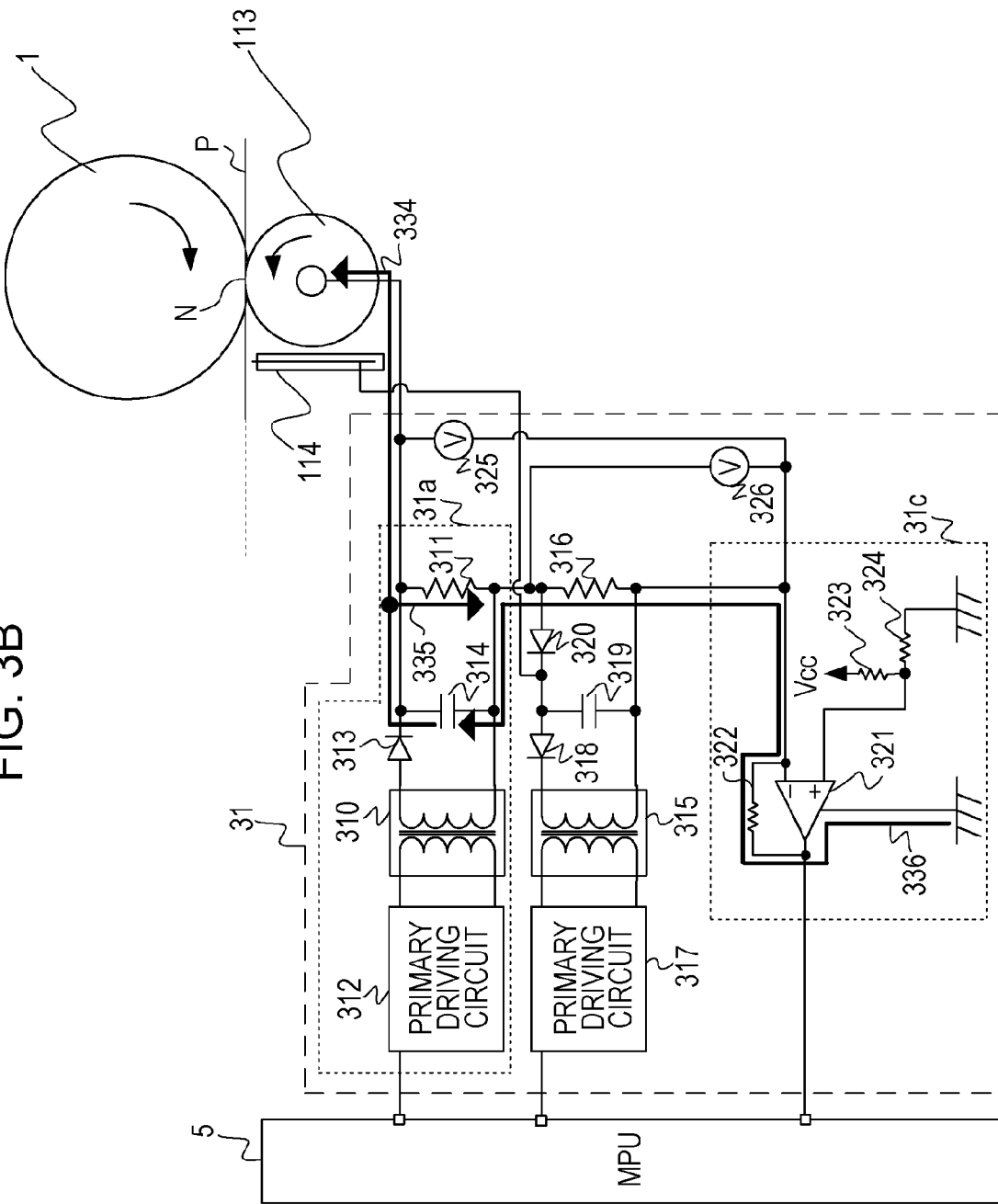

FIG. 3B is a diagram illustrating current paths of the positive high-voltage circuit 31a. In FIG. 3B, the output of the positive high-voltage circuit 31a is in the on state, and the output of the negative high-voltage circuit 31b is in the off state. Current paths established when the positive high-voltage circuit 31a applies the transfer positive voltage having a positive polarity to the transfer roller 113 are paths 334 and 336. The path 334 is a path through which positive current from the positive high-voltage circuit 31a (capacitor 314) flows into the GND (not illustrated) of the photosensitive drum 1 through the transfer roller 113 and the recording material P. The path 336 is a path through which positive current from the GND of the current detection circuit 31c returns to the positive high-voltage circuit 31a (capacitor 314) through the operational amplifier 321 and the resistor 322 of the current detection circuit 31c and the resistor 316. In addition, a path 335 is a current path through which current does not flow into the processing members. Through the path 335, positive current from the positive high-voltage circuit 31a returns to the positive high-voltage circuit 31a through the resistor 311.

Next, the operation of the diode 320, which is a separation device that is one of the characteristics of this embodiment, will be described. Reverse voltage is applied to the diode 320 through the path 336. Therefore, there is no path for negative current that returns from the GND (not illustrated) of the photosensitive drum 1 to the positive high-voltage circuit 31a (capacitor 314) through the recording material P, the neutralizing pins 114, and the diode 320. More specifically, if the resistor 316 is 10 MΩ and the current flowing through the path 336 is 20 μA, a voltage drop of 200 V is generated across ends of the resistor 316. Because a negative input of the operational amplifier 321 of the current detection circuit 31c, which will be described later, is several volts, the voltage of the anode of the diode 320 is about −200 V. On the other hand, since the output of the negative high-voltage circuit 31b is in the off state, the voltage of the cathode of the diode 320 is substantially the same as that of the negative input of the operational amplifier 321, that is, several volts. Therefore, reverse voltage is applied to the diode 320.

Thus, since reverse voltage is applied to the diode 320, there is no path for negative voltage that returns to from the GND (not illustrated) of the photosensitive drum 1 to the positive high-voltage circuit 31a through the recording material P, the neutralizing pins 114, and the diode 320. Therefore, the current flowing through the path 334 and the current flowing through the path 336 match, and accordingly the current detection circuit 31c can detect the transfer positive voltage having a positive polarity flowing into the transfer roller 113.

Current Detection Circuit

Next, the current detection circuit 31c will be described. In this embodiment, because the MPU 5 performs ATVC on the transfer roller 113, the current detection circuit 31c detects current flowing into the transfer roller 113 when the transfer positive voltage is applied to the transfer roller 113. Here, the ATVC refers to a type of control in which a certain voltage is applied to the transfer roller 113, current flowing through the transfer roller 113 is detected, and, when an image is formed, voltage applied to the transfer roller 113 is controlled on the basis of a result of the detection. In FIG. 2, the current detection circuit 31c includes the operational amplifier 321 and the resistors 322, 323, and 324 connected to the step-up transformer 315 and feeds an output of the operational amplifier 321 back to the MPU 5. Voltage (hereinafter denoted by Vt) obtained by dividing power supply voltage Vcc using the resistors 323 and 324 is input to a positive input of the operational amplifier 321. The voltage Vt is set at several volts in consideration of the rating of the operational amplifier 321. Here, since the operational amplifier 321 configures a negative feedback circuit along with the resistor 322, a potential difference between the positive input and the negative input of the operational amplifier 321 is 0 V. That is, the voltage Vt is input to the positive input and the negative input of the operational amplifier 321.

If the output of the positive high-voltage circuit 31a is turned on, voltage is generated on the transfer roller 113, and current flows into the transfer roller 113. Current paths at this time are the paths 334 and 336 illustrated in FIG. 3B. Therefore, the same level of current as that of current flowing into the transfer roller 113 flows into the resistor 322. As a result, voltage is generated at ends of the resistor 322. The output (hereinafter this voltage will be denoted by Visns) of the operational amplifier 321 is represented by the following Expression 1.

$$Visns = Vt + R322 \times Io \quad \text{(Expression 1)}$$

Here, R322 denotes the resistance of the resistor 322, and Io denotes the current flowing into the transfer roller 113. Information in which the voltage Visns and the current Io flowing into the transfer roller 113 are associated with each other is stored in a storage device (not illustrated) of the MPU 5 in advance. The MPU 5 can detect the value of current flowing into the transfer roller 113 based on Expression 1 and the voltage Visns output from the current detection circuit 31c.

As described above, according to this embodiment, by integrating a plurality of high-voltage circuits with one another, the number of high-voltage circuits can be decreased while maintaining a function of the image forming apparatus 100 of supplying high voltage, thereby reducing the high-voltage power supply device 3 in size. In this embodiment, the transfer power supply including the current detection circuit supplies the neutralizing voltage, and the current paths are separated from each other using the diode so that the detection of current performed by the transfer power supply is not affected. As a result, the number of negative high-voltage circuits can be reduced, thereby bringing down costs for the circuits and reducing a circuit board in size.

Separation Device According to Modification

Figure 4:
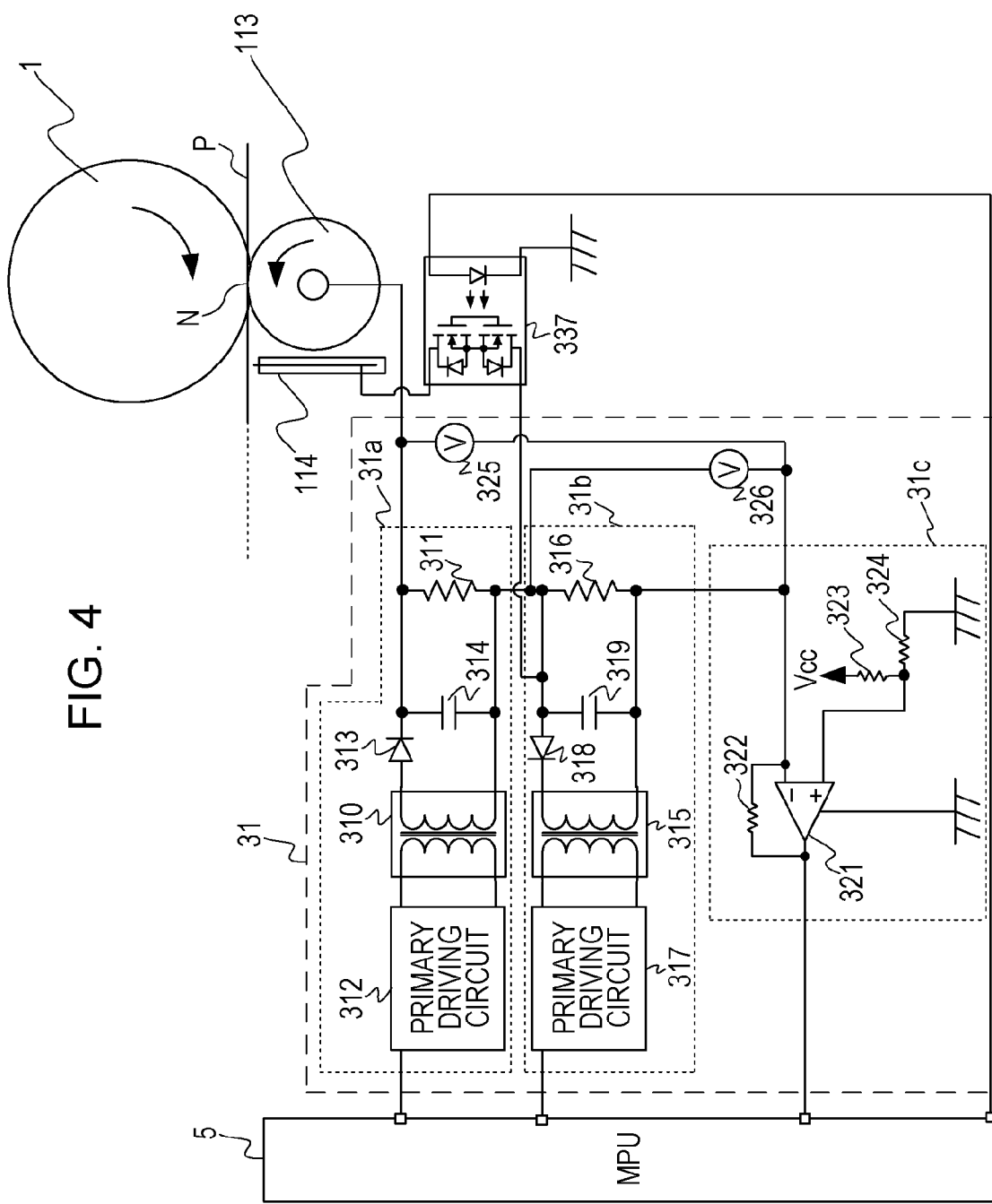
FIG. 4 is a diagram illustrating the configurations of a transfer device and a transfer power supply according to a modification.

As illustrated in FIG. 2, in the above embodiment, the current path of the transfer voltage and the current path of the neutralizing voltage are separated from each other by the diode 320, which is the separation device. As illustrated in FIG. 4, however, the current path of the transfer voltage or the current path of the neutralizing voltage may be closed, for example, by an optical insulation solid-state relay 337, which is a separation device, instead. In FIG. 4, the same components as those illustrated in FIG. 2 are given the same reference numerals, and accordingly description thereof is omitted.

In the case of a circuit illustrated in FIG. 4, the optical insulation solid-state relay 337 is turned off in accordance with an instruction from the MPU 5, that is, for example, a low-level signal output from the MPU 5. When the optical insulation solid-state relay 337 is turned off, a current path between the negative high-voltage circuit 31b and the neutralizing pins 114 is closed. In this case, a dedicated signal is necessary to close the current path, but the number of negative high-voltage circuits can be reduced, thereby bringing down the costs for the circuits and reducing the circuit board in size. Furthermore, even if a device for closing a current path is, for example, a device capable of stopping supply of current, such as a metal-oxide-semiconductor field-effect transistor (MOSFET) relay, a field-effect transistor (FET), a photocoupler, or an electromagnetic relay, the same effects can be produced. In a second and other embodiments, similarly, one of these device may be used as the separation device that separates (or closes) current paths from each other.

In addition, although the values of the voltage detection circuits 325 and 326 are fed back to the MPU 5 for the purpose of the constant voltage control in the above embodiment, the values of the voltage detection circuits 325 and 326 may be fed back to the primary driving circuits 312 and 317, respectively, for the purpose of the constant voltage control, instead.

As described above, according to the above embodiment, the size and costs of the power supply device 3 can be reduced while maintaining a function of accurately detecting current.

Second Embodiment

Figure 5:
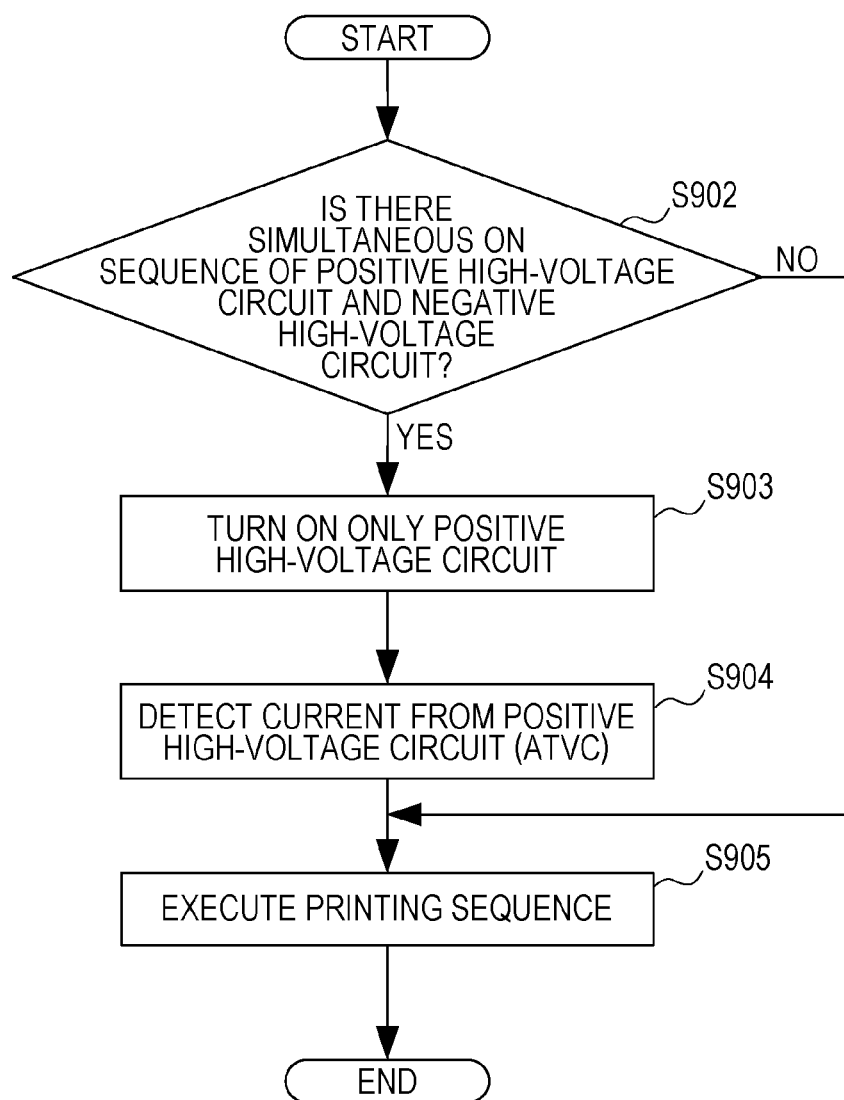
FIG. 5 is a flowchart illustrating a process performed by an image forming apparatus according to a second embodiment.

FIG. 5 is a flowchart according to the second embodiment. In the first embodiment, current flowing from the positive high-voltage circuit 31a is detected with the negative high-voltage circuit 31b in the off state. On the other hand, in this embodiment, even if both the positive high-voltage circuit 31a and the negative high-voltage circuit 31b are in the on state, a desired current can flow as the transfer positive voltage having a positive polarity. Differences from the first embodiment will be described with reference to FIGS. 3A and 3B. For example, the neutralizing voltage may or may not be applied to the neutralizing pins 114 depending on an environment, the type of sheet, and printing speed. If the neutralizing voltage is applied to the neutralizing pins 114, the transfer positive voltage having a positive polarity is applied to the transfer roller 113 in order to transfer a toner image on the photosensitive drum 1 onto the recording material P. Next, the negative neutralizing voltage is applied to the neutralizing pins 114 while the transfer roller 113 is performing the transfer. In this case, the outputs of the positive high-voltage circuit 31a and the negative high-voltage circuit 31b are both in the on state.

At this time, current from the positive high-voltage circuit 31a and current from the negative high-voltage circuit 31b simultaneously flow into the transfer roller 113. Therefore, current flows through all of the paths 330, 331, 333, 334, and 336. Current flowing into the transfer roller 113 is the sum of the currents flowing through the paths 330 and 334. Current flowing into the current detection circuit 31c is the sum of the currents flowing through the paths 333 and 336. Although the currents flowing through the paths 334 and 336 are the same, the currents flowing through the paths 330 and 333 are different from each other since current flows through the path 331. As a result, it is difficult for the current detection circuit 31c to detect the current flowing into the transfer roller 113 correctly.

Process for Detecting Current

Therefore, the procedure of a process according to this embodiment will be described with reference to the flowchart of FIG. 5. If the MPU 5, which controls the high-voltage power supply device 3, receives a command to start printing, the following process begins. In step (hereinafter denoted by an "S") 902, the MPU 5 determines whether a printing sequence includes a simultaneous on sequence, in which the positive high-voltage circuit 31a and the negative high-voltage circuit 31b are in the on state at the same time. If the MPU 5 determines in S902 that there is a simultaneous on sequence of the positive high-voltage circuit 31a and the negative high-voltage circuit 31b, the process proceeds to S903. In S903, before executing the printing sequence, the MPU 5 turns on only the positive high-voltage circuit 31a. In S904, the MPU 5 detects current from the positive high-voltage circuit 31a, that is, executes the ATVC, using the current detection circuit 31c. Since the MPU 5 turns on only the positive high-voltage circuit 31a in S903, the negative high-voltage circuit 31b is in the off state. At this time, current paths to the transfer roller 113 are the paths 334 and 336 illustrated in FIG. 3B. Therefore, the current detection circuit 31c can correctly detect the transfer positive voltage having a positive polarity flowing into the transfer roller 113. In S905, the MPU 5 executes the printing sequence. During a printing operation, the transfer positive voltage is determined using a result of the detection performed by the current detection circuit 31c in S904, that is, a result of the ATVC, and the constant voltage control is performed.

On the other hand, if the MPU 5 determines in S902 that there is no simultaneous on sequence of the positive high-voltage circuit 31a and the negative high-voltage circuit 31b, the MPU 5 executes the printing sequence in S905. If the MPU 5 determines that there is no simultaneous on sequence of the positive high-voltage circuit 31a and the negative high-voltage circuit 31b, the MPU 5 executes constant current control during the printing sequence as necessary.

As described above, according to this embodiment, a desired current can flow as the transfer positive voltage having a positive polarity even if the positive high-voltage circuit 31a and the negative high-voltage circuit 31b are in the on state at the same time. As a result, by integrating a plurality of high-voltage circuits with one another, the number of high-voltage circuits can be decreased while maintaining the function of the image forming apparatus 100 of supplying high voltage, thereby reducing the high-voltage power supply device 3 in size. As described above, according to this embodiment, the size and costs of the power supply device 3 can be reduced while maintaining the function of accurately detecting current.

Third Embodiment (1) Configuration of Image Forming Apparatus and Transfer Unit

Figure 1B:
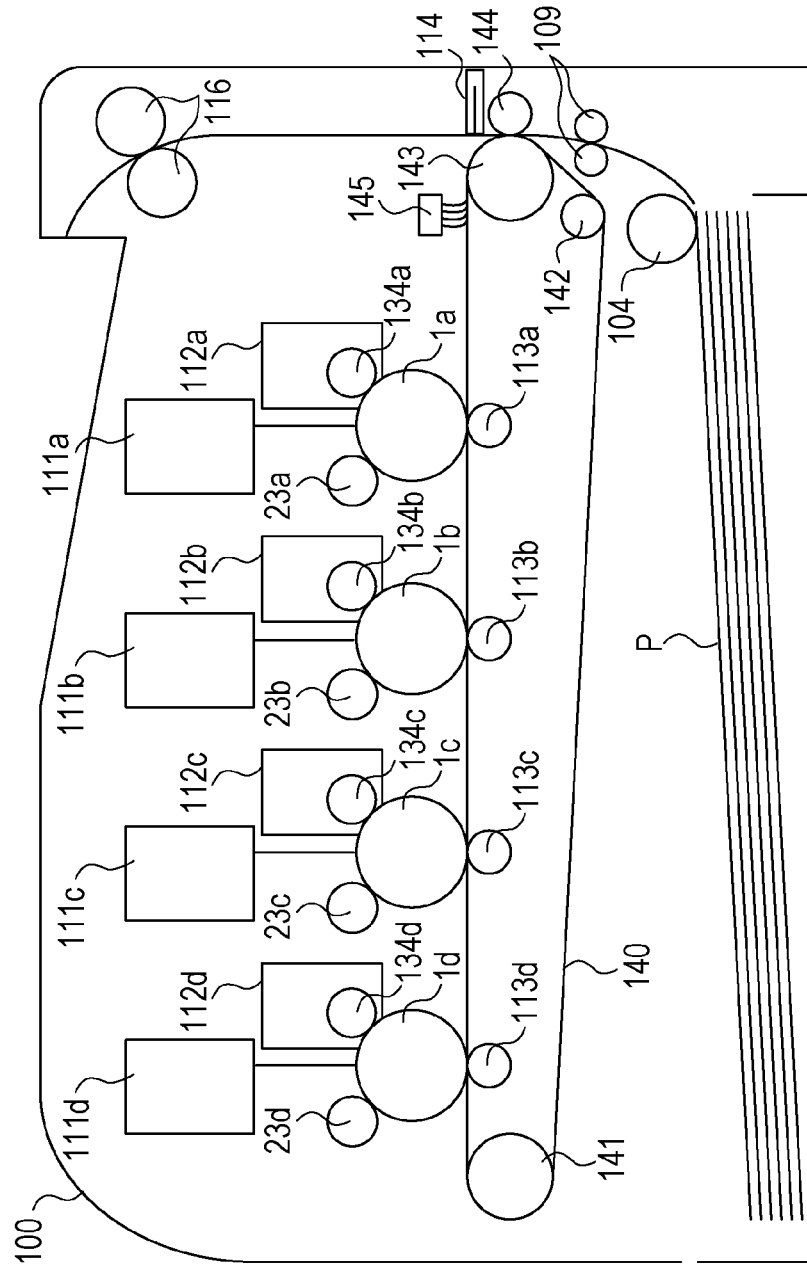

FIG. 1B is a schematic diagram illustrating the configuration of an image forming apparatus 100 according to a third embodiment. In FIG. 1B, the same components as those according to the first embodiment illustrated in FIG. 1A are given the same reference numerals, and accordingly description of the operations thereof is omitted. One of major differences between this embodiment illustrated in FIG. 1B and the first embodiment illustrated in FIG. 1A is that a plurality of image bearing members (photosensitive drums) and an intermediate transfer member (intermediate transfer belt) are included in this embodiment. The image forming apparatus 100 illustrated in FIG. 1B includes the same number of (for example, four) image forming units as the number of colors. In FIG. 1B, the reference numerals of the image forming units are given additional letters, namely a, b, c, and d, respectively. The additional letters a, b, c, and d are omitted unless necessary.

FIG. 1B illustrates the image forming apparatus 100 including an intermediate transfer member (hereinafter referred to as an "intermediate transfer belt") 140. The intermediate transfer belt 140 is wounded on rollers 141, 142, and 143. In the image forming apparatus 100, when images are formed, toner images on the photosensitive drum 1 developed by a developer 112 are sequentially transferred onto the intermediate transfer belt (intermediate transfer member) 140 in an overlapping manner using transfer voltage applied to the transfer roller 113 from a primary transfer power supply (not illustrated). Thereafter, a secondary transfer positive power supply (not illustrated) applies transfer voltage having a positive polarity to a secondary transfer roller 144, which is a transfer device (first member), in order to transfer the toner images on the intermediate transfer belt 140 onto the recording material P. Toner that has not been transferred onto the recording material P and left on the intermediate transfer belt 140 is temporarily collected by a cleaning brush 145 using voltage having a positive polarity applied to the cleaning brush 145 from a cleaning positive power supply.

On the other hand, during a cleaning process, toner applied to the secondary transfer roller 144 is transferred onto the intermediate transfer belt 140 and removed from the secondary transfer roller 144 using voltage having a negative polarity applied to the secondary transfer roller 144. The toner temporarily collected by the cleaning brush 145 is discharged onto the intermediate transfer belt 140 using the voltage having a negative polarity applied to the cleaning brush 145. Thereafter, the toner discharged onto the intermediate transfer belt 140 is transferred (that is, reversely transferred) onto the photosensitive drum 1 from the intermediate transfer belt 140 and collected by a cleaner container (not illustrated) in the photosensitive drum 1.

(2) Outline of Common Voltage Generation Circuit

Figure 6:
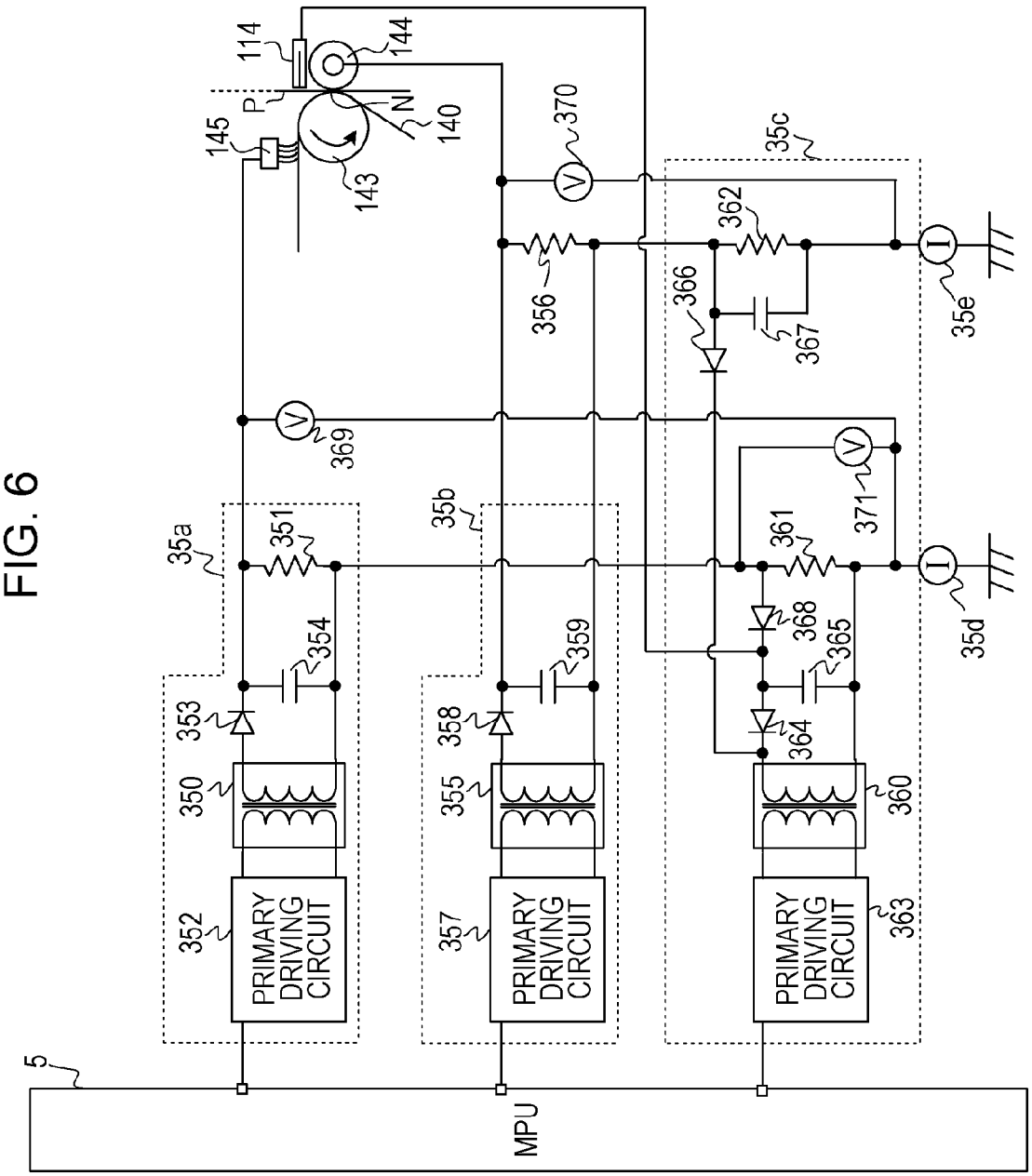
FIG. 6 is a diagram illustrating the configuration of a transfer device and a transfer power supply according to the third embodiment.

FIG. 6 is a schematic diagram illustrating the configuration of a transfer power supply of the image forming apparatus 100 according to this embodiment. Major difference between this embodiment illustrated in FIG. 6 and the first embodiment illustrated in FIG. 2 are as follows. First, the transfer power supply according to this embodiment includes two current detection circuits, and a power supply in which two positive power supplies, namely a positive power supply for secondary transfer and a positive power supply for cleaning the intermediate transfer belt 140, are superimposed upon a negative power supply supplies neutralizing voltage necessary for the image forming apparatus 100. Second, current paths are separated from each other by a diode 368 so that detection of current performed by the two current detection circuit is not affected.

A common voltage generation circuit includes a negative high-voltage circuit 35c, a secondary transfer positive high-voltage circuit 35b, and a cleaning positive high-voltage circuit 35a. Furthermore, the common voltage generation circuit includes a secondary transfer current detection circuit 35e, which is a first detection device, and a cleaning current detection circuit 35d, which is a second detection device. In the following description, the secondary transfer current detection circuit 35e will be simply referred to as a "current detection circuit 35e", and the cleaning current detection circuit 35d will be simply referred to as a "current detection circuit 35d". The configurations of the current detection circuits 35d and 35e are the same as that of the current detection circuit 31c according to the first embodiment, and accordingly description thereof is omitted. The secondary transfer positive high-voltage circuit 35b generates secondary transfer positive voltage having a positive polarity. The secondary transfer positive voltage having a positive polarity is output in order to transfer a toner image on the intermediate transfer belt 140 onto the recording material P by applying charge having a polarity (positive polarity) opposite that of the toner image to the recording material P. The cleaning positive high-voltage circuit 35a generates cleaning positive voltage having a positive polarity. The cleaning positive voltage having a positive polarity is output in order to make the cleaning brush 145 collect the toner image on the intermediate transfer belt 140 by applying charge having a polarity (positive polarity) opposite that of the toner image to the cleaning brush 145.

The negative high-voltage circuit 35c generates secondary transfer negative voltage having a negative polarity, cleaning negative voltage having a negative polarity, and neutralizing voltage having a negative polarity. The secondary transfer negative voltage is output in order to remove toner left on a surface of the secondary transfer roller 144 by collecting the toner using the cleaning brush 145 and the photosensitive drum 1 after a toner image is transferred onto the recording material P. The cleaning negative voltage is output in order to clean the cleaning brush 145 by discharging the toner collected by the cleaning brush 145 onto the intermediate transfer belt 140 and collecting the toner using the photosensitive drum 1. The neutralizing voltage is output in order to neutralize the recording material P that has passed through the transfer nip N.

The current detection circuit 35e detects current output from the secondary transfer positive high-voltage circuit 35b, and the current detection circuit 35d detects current output from the cleaning positive high-voltage circuit 35a. In this embodiment, the MPU 5 performs ATVC on the secondary transfer roller 144. Therefore, the current detection circuit 35e detects current flowing into the secondary transfer roller 144 at a time when the secondary transfer positive voltage is applied to the secondary transfer roller 144. In addition, in this embodiment, the MPU 5 performs ATVC on the cleaning brush 145. Therefore, the current detection circuit 35d detects current flowing into the cleaning brush 145 at a time when the cleaning positive voltage is applied to the cleaning brush 145.

Negative High-Voltage Circuit

The configuration of the negative high-voltage circuit 35c will be described hereinafter. The negative high-voltage circuit 35c, which is a third circuit, includes a step-up transformer 360, a primary driving circuit 363, a secondary transfer rectification device (366 and 367), and a cleaning rectification device (364 and 365). The primary driving circuit 363 drives the step-up transformer 360 in accordance with a control signal from the MPU 5. The step-up transformer 360 generates alternating-current high voltage in a secondary coil when the primary driving circuit 363, which includes a switching device, supplies alternating-current power to a primary coil. A diode 366 and a high-voltage capacitor (hereinafter simply referred to as a "capacitor") 367, which constitute the secondary transfer rectification device, rectify the alternating-current high voltage generated in the secondary coil of the step-up transformer 360 as negative direct-current high voltage. A diode 364 and a high-voltage (hereinafter simply referred to as a "capacitor") 365, which constitute the cleaning rectification device, rectify the alternating-current high voltage generated in the secondary coil of the step-up transformer 360 as negative direct-current high voltage.

Here, resistors 361 and 362 are bleeder resistors of the negative high-voltage circuit 35c. A voltage detection circuit 371 divides the direct-current high voltage from the negative high-voltage circuit 35c and feeds resultant voltage back (not illustrated) to the MPU 5. The MPU 5 performs constant voltage control on the negative high-voltage circuit 35c on the basis of the feedback from the voltage detection circuit 371. A cathode of the diode 368 supplies the negative direct-current high voltage from the negative high-voltage circuit 35c to the neutralizing pins 114. On the other hand, an anode of the diode 368 supplies the negative direct-current high voltage from the negative high-voltage circuit 35c to the cleaning brush 145 through a resistor 351. In addition, an anode of the diode 366 supplies negative direct-current high voltage from the negative high-voltage circuit 35c to the secondary transfer roller 144 through a resistor 356.

Current Paths of Negative High-Voltage Circuit

Figure 7A:
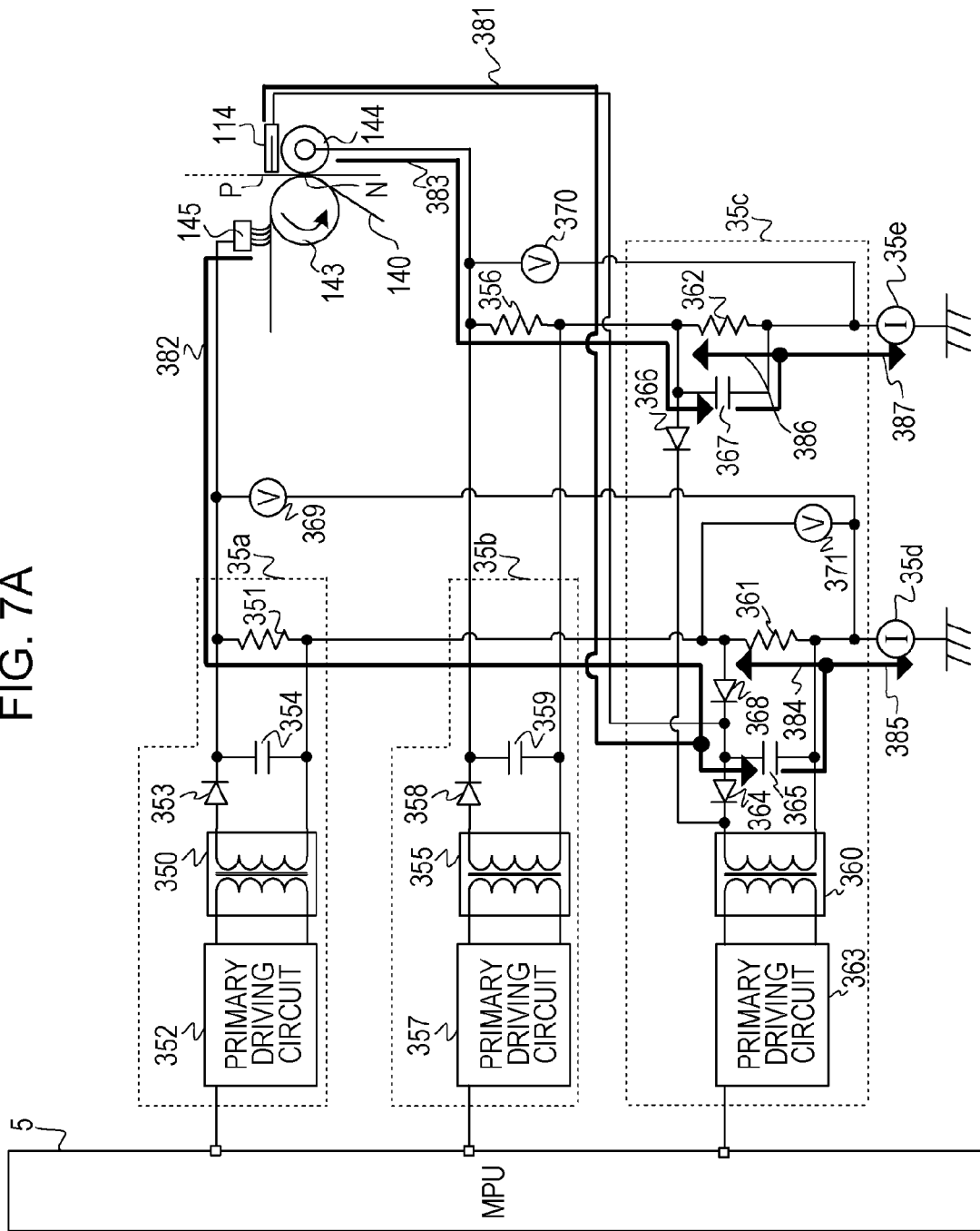
FIGS. 7A and 7B are diagrams illustrating current paths from a secondary transfer voltage generation circuit, a cleaning voltage generation circuit, and a neutralizing voltage generation circuit according to the third embodiment.

FIG. 7A is a diagram illustrating current paths of the negative high-voltage circuit 35c. In FIG. 7A, outputs of the secondary transfer positive high-voltage circuit 35b and the cleaning positive high-voltage circuit 35a are in the off state, and an output of the negative high-voltage circuit 35c is in the on state. If the output of the negative high-voltage circuit 35c is in the on state, negative current flows into all of the secondary transfer roller 144, the cleaning brush 145, and the neutralizing pins 114, which constitute the electricity eliminating device. Current paths established when the negative high-voltage circuit 35c applies the secondary transfer negative voltage having a negative polarity to the secondary transfer roller 144 are paths 383 and 387. The path 383 is a path through which negative current from a GND of the secondary transfer facing roller 143 reaches the negative high-voltage circuit 35c (capacitor 367) through the intermediate transfer belt 140, the recording material P, the secondary transfer roller 144, and the resistor 356. The path 387 is a path through which current from the negative high-voltage circuit 35c (capacitor 367) flows into a GND of the current detection circuit 35e.

Current paths established when the negative high-voltage circuit 35c applies the cleaning negative voltage having a negative polarity to the cleaning brush 145 are paths 382 and 385. The path 382 is a path through which negative current from the GND (not illustrated) of the secondary transfer facing roller 143 reaches the negative high-voltage circuit 35c (capacitor 365) through the intermediate transfer belt 140, the cleaning brush 145, the resistor 351, and the diode 368. The path 385 is a path through which current from the negative high-voltage circuit 35c (capacitor 365) flows into a GND of the current detection circuit 35d.

Current paths established when the negative high-voltage circuit 35c applies the negative neutralizing voltage to the neutralizing pins 114 are paths 381 and 385. The path 381 is a path through which negative current from the GND (not illustrated) of the secondary transfer facing roller 143 reaches the negative high-voltage circuit 35c (capacitor 365) through the intermediate transfer belt 140, the recording material P, and the neutralizing pins 114. The path 385 is the same as when the negative high-voltage circuit 35c applies the cleaning negative voltage having a negative polarity to the cleaning brush 145, and accordingly description thereof is omitted. In addition, the following paths are paths through which current does not flow into the processing members such as the secondary transfer roller 144, the cleaning brush 145, and the neutralizing pins 114: that is, a path 386 through which current from the negative high-voltage circuit 35c (capacitor 367) returns to the negative high-voltage circuit 35c through the resistor 362 and a path 384 through which current from the negative high-voltage circuit 35c (capacitor 365) returns to the negative high-voltage circuit 35c through the resistor 361 and the diode 368.

Secondary Transfer Positive High-Voltage Circuit

Next, the configuration of the secondary transfer positive high-voltage circuit 35b will be described hereinafter. The secondary transfer positive high-voltage circuit 35b, which is a first circuit, includes, as with the negative high-voltage circuit 35c, a step-up transformer 355, a primary driving circuit 357, and a rectification device (358 and 359). The secondary transfer positive high-voltage circuit 35b generates alternating-current high voltage in a secondary coil of the step-up transformer 355 when the primary driving circuit 357, which includes a switching device, supplies alternating-current power to a primary coil of the step-up transformer 355. A diode 358 and a high-voltage capacitor 359, which constitute the rectification device, rectify the alternating-current high voltage generated in the secondary coil of the step-up transformer 355 as positive direct-current high voltage. Here, the resistor 356 is a bleeder resistor of the secondary transfer positive high-voltage circuit 35b. The negative high-voltage circuit 35c and the secondary transfer positive high-voltage circuit 35b are connected in series with each other, and the direct-current high voltage generated thereby are supplied to the secondary transfer roller 144 through the bleeder resistors 362 and 356, respectively. A voltage detection circuit 370 divides the direct-current high voltage applied to the secondary transfer roller 144 and feeds resultant voltage back (not illustrated) to the MPU 5. The MPU 5 performs constant voltage control on the secondary transfer positive high-voltage circuit 35b on the basis of the feedback from the voltage detection circuit 370.

Cleaning Positive High-Voltage Circuit

Next, the configuration of the cleaning positive high-voltage circuit 35a will be described hereinafter. The cleaning positive high-voltage circuit 35a, which is a second circuit, includes, as with the secondary transfer positive high-voltage circuit 35b, a step-up transformer 350, a primary driving circuit 352, and a rectification device (353 and 354). The cleaning positive high-voltage circuit 35a generates alternating-current high voltage in a secondary coil of the step-up transformer 350 when the primary driving circuit 352, which includes a switching device, supplies alternating-current power to a primary coil of the step-up transformer 350. A diode 353 and a high-voltage capacitor 354, which constitute the rectification device, rectify the alternating-current high voltage generated in the secondary coil of the step-up transformer 350 as positive direct-current high voltage.

Here, the resistor 351 is a bleeder resistor of the cleaning positive high-voltage circuit 35a. The negative high-voltage circuit 35c and the cleaning positive high-voltage circuit 35a are connected in series with each other, and the direct-current high voltage generated thereby are supplied to the cleaning brush 145 through the bleeder resistors 361 and 351, respectively. A voltage detection circuit 369 divides the direct-current high voltage applied to the cleaning brush 145 and feeds resultant voltage back (not illustrated) to the MPU 5. The MPU 5 performs constant voltage control on the cleaning positive high-voltage circuit 35a on the basis of the feedback from the voltage detection circuit 369.

Figure 7B:
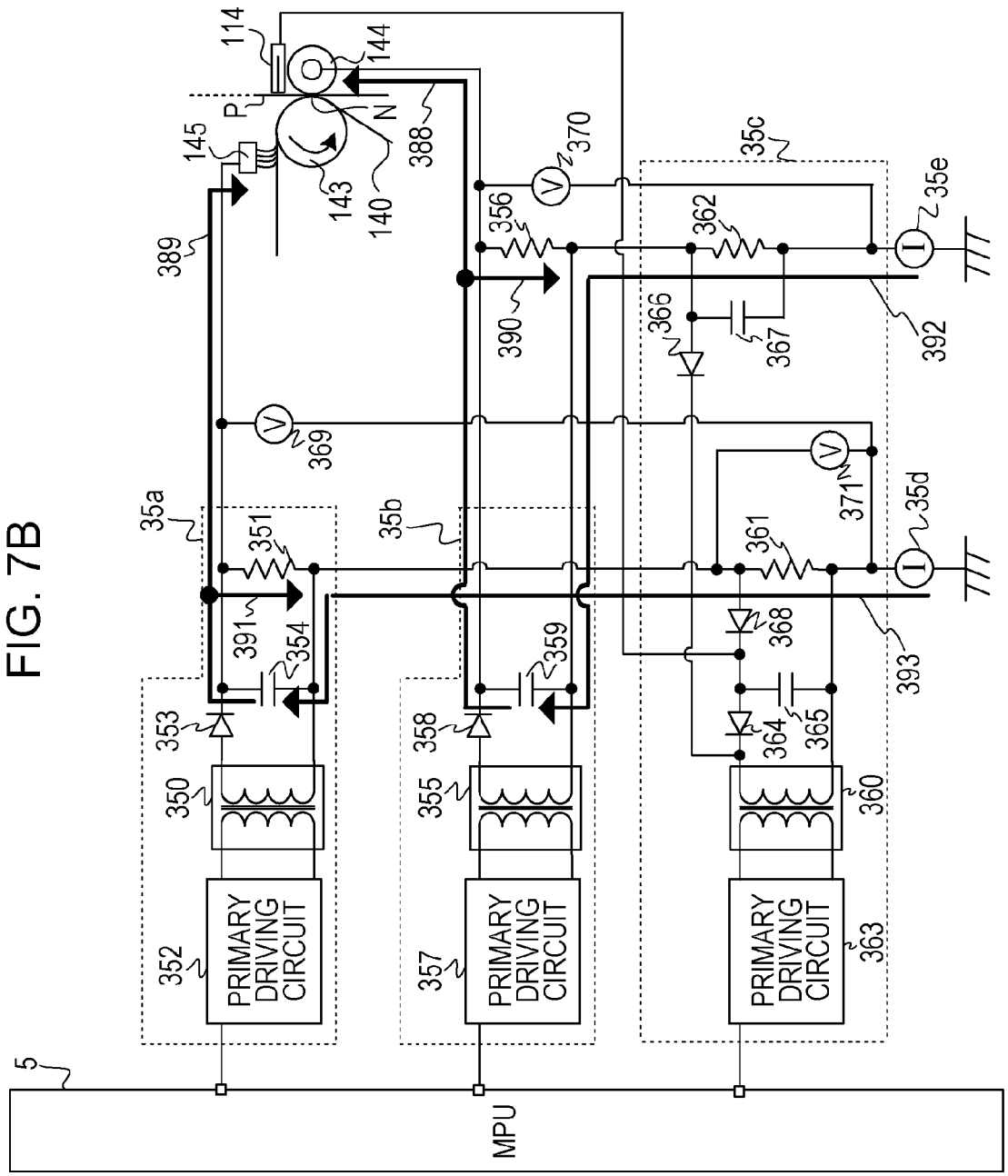

Current Paths of Secondary Transfer Positive High-Voltage Circuit and Cleaning Positive High-Voltage Circuit FIG. 7B is a diagram illustrating current paths of the secondary transfer positive high-voltage circuit 35b and the cleaning positive high-voltage circuit 35a. In FIG. 7B, the outputs of the secondary transfer positive high-voltage circuit 35b and the cleaning positive high-voltage circuit 35a are in the on state, and the output of the negative high-voltage circuit 35c is in the off state. Current paths established when the secondary transfer positive high-voltage circuit 35b applies the secondary transfer positive voltage having a positive polarity to the secondary transfer roller 144 are paths 388 and 392. The path 388 is a path through which current from the secondary transfer positive high-voltage circuit 35b (capacitor 359) flows into the GND (not illustrated) of the secondary transfer facing roller 143 through the secondary transfer roller 144, the recording material P, and the intermediate transfer belt 140. The path 392 is a path through which current from the GND of the current detection circuit 35e returns to the secondary transfer positive high-voltage circuit 35b (capacitor 359) through the resistor 362.

Current paths established when the cleaning positive high-voltage circuit 35a applies the cleaning positive voltage having a positive polarity to the cleaning brush 145 are paths 389 and 393. The path 389 is a path through which current from the cleaning positive high-voltage circuit 35a (capacitor 354) flows into the GND (not illustrated) of the secondary transfer facing roller 143 through the cleaning brush 145 and the intermediate transfer belt 140. The path 393 is a path through which current from the GND of the current detection circuit 35d returns to the cleaning positive high-voltage circuit 35a (capacitor 354) through the resistor 361. In addition, a path 390 is a current path through which current does not flow into the processing members. Through the path 390, current from the secondary transfer positive high-voltage circuit 35b (capacitor 359) returns to the secondary transfer positive high-voltage circuit 35b through the resistor 356. Furthermore, a path 391 is a current path through which current does not flow into the processing members. Through the path 391, current from the cleaning positive high-voltage circuit 35a (capacitor 354) returns to the cleaning positive high-voltage circuit 35a through the resistor 351.

Next, the operation of the diode 368, which is a separation device that is one of the characteristics of this embodiment, will be described. Reverse voltage is applied to the diode 368 through the path 393. Therefore, there is no path for negative current that returns from the GND (not illustrated) of the secondary transfer facing roller 143 to the cleaning positive high-voltage circuit 35a (capacitor 354) through the recording material P, the neutralizing pins 114, and the diode 368. More specifically, if the resistor 361 is 10 MΩ and the current flowing through the path 393 is 20 µA, a voltage drop of 200 V is generated across ends of the resistor 361. Therefore, the voltage of the anode of the diode 368 is about −200 V. On the other hand, since the output of the negative high-voltage circuit 35c is in the off state, the voltage of the cathode of the diode 368 is, as in the first embodiment, substantially the same as that of a negative input (not illustrated) of an operational amplifier of the current detection circuit 35d, that is, several volts. Therefore, reverse voltage is applied to the diode 368.

Thus, there is no path for negative voltage that returns to from the GND (not illustrated) of the secondary transfer facing roller 143 to the cleaning positive high-voltage circuit 35a through the intermediate transfer belt 140, the recording material P, the neutralizing pins 114, and the diode 368. Therefore, the current flowing through the path 389 and the current flowing through the path 393 match, and accordingly the current detection circuit 35d can detect the cleaning positive voltage having a positive polarity flowing into the cleaning brush 145. In addition, because of the diode 368, there is no negative current flowing from the GND of the secondary transfer facing roller 143 to the neutralizing pins 114 through the intermediate transfer belt 140 and the recording material P. Therefore, the current flowing through the path 388 and the current flowing through the path 392 match, and accordingly the current detection circuit 35e can detect the secondary transfer positive voltage having a positive polarity flowing into the secondary transfer roller 144.

As described above, according to this embodiment, by integrating a plurality of high-voltage circuits with one another, the number of high-voltage circuits can be decreased while maintaining the function of the image forming apparatus 100 of supplying high voltage, thereby reducing the high-voltage power supply device 3 in size. In this embodiment, the current detection circuits are included, and the power supply in which two different positive power supplies are superimposed upon a negative power supply supplies power. In addition, the current paths are separated from each other using the diode so that detection of current performed by the two positive power supplies is not affected. As a result, the number of negative high-voltage circuits can be reduced, thereby bringing down costs for the circuits and reducing a circuit board in size. Although the cleaning rectification device (364 and 365) supplies the negative neutralizing voltage in this embodiment, the secondary transfer rectification device may supply the negative neutralizing voltage, instead. In this case, for example, a diode as a separation device may be connected between the neutralizing pins 114 and the secondary transfer roller 144.

As described above, according to this embodiment, the size and cost of the power supply device 3 can be reduced while maintaining the function of accurately detecting current.

Fourth Embodiment

Figure 8:
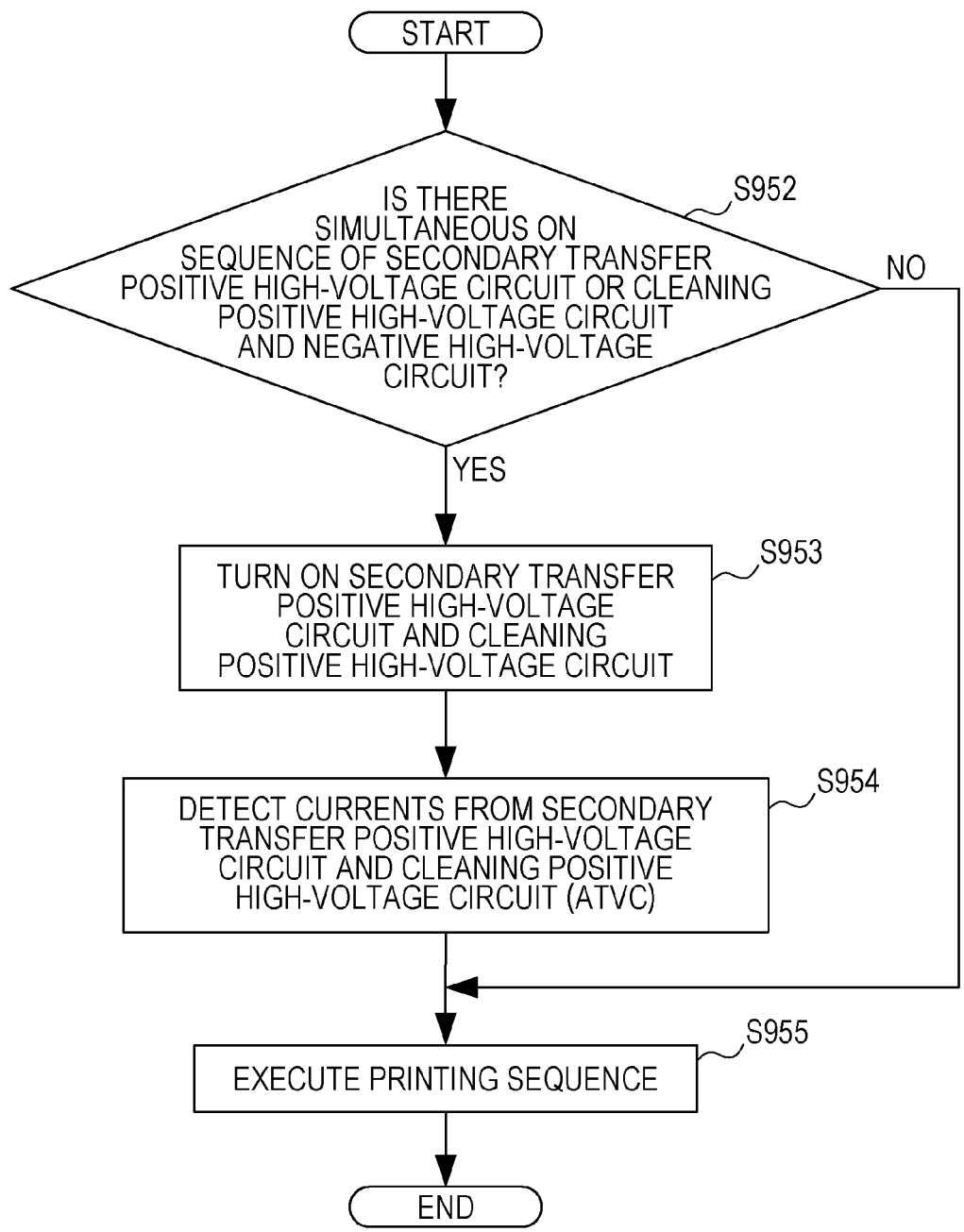
FIG. 8 is a flowchart illustrating a process performed by an image forming apparatus according to a fourth embodiment.

FIG. 8 is a flowchart according to a fourth embodiment. In the third embodiment, as in the first embodiment, detection of current from one of the positive high-voltage circuits is performed with the negative high-voltage circuit in the off state. In this embodiment, even if one of the positive high-voltage circuits and the negative high-voltage circuit are in the on state at the same time, a desired current can flow as the transfer positive voltage having a positive polarity. Differences from the third embodiment will be described with reference to FIGS. 7A and 7B. As in the second embodiment, the neutralizing voltage may or may not be applied to the neutralizing pins 114 depending on the environment, the type of sheet, and the printing speed. If the neutralizing voltage is applied, the secondary transfer positive high-voltage circuit 35b applies the secondary transfer positive voltage having a positive polarity to the secondary transfer roller 144 in order to transfer a toner image on the intermediate transfer belt 140 onto the recording material P.

On the other hand, the cleaning positive high-voltage circuit 35a applies the cleaning positive voltage having a positive polarity to the cleaning brush 145 in order to collect the toner image on the intermediate transfer belt 140. Furthermore, the negative high-voltage circuit 35c applies the neutralizing voltage having a negative polarity to the neutralizing pins 114 in order to neutralize the recording material P. In this case, the outputs of the secondary transfer positive high-voltage circuit 35b, the cleaning positive high-voltage circuit 35a, and the negative high-voltage circuit 35c are all in the on state.

At this time, currents from the secondary transfer positive high-voltage circuit 35b and the negative high-voltage circuit 35c simultaneously flow into the secondary transfer roller 144. Therefore, current flows through all of the paths 381, 382, 383, 385, 387, 388, 389, 392, and 393. Current flowing into the secondary transfer roller 144 is the sum of the currents flowing through the paths 383 and 388, and current flowing into the current detection circuit 35e is the sum of the currents flowing through the paths 387 and 392. The currents flowing through the paths 388 and 392 are the same, but because the currents flowing through the paths 387 and 383 are different from each other due to the current flowing through the path 381, it is difficult for the current detection circuit 35e to detect the current flowing into the secondary transfer roller 144 correctly. Similarly, current flowing into the cleaning brush 145 is the sum of the currents flowing through the paths 382 and 389, and current flowing into the current detection circuit 35d is the sum of the currents flowing through the paths 385 and 393. The currents flowing through the paths 389 and 393 are the same, but because the currents flowing through the paths 385 and 382 are different from each other due to the current flowing through the path 381, it is difficult for the current detection circuit 35d to detect the current flowing into the cleaning brush 145 correctly.

Therefore, the procedure of a process according to this embodiment will be described with reference to the flowchart of FIG. 8. If the MPU 5, which controls the high-voltage power supply device 3, receives a command to start printing, the MPU 5 performs the following control. In S952, the MPU 5 determines whether a printing sequence includes a simultaneous on sequence, in which the secondary transfer positive high-voltage circuit 35b or the cleaning positive high-voltage circuit 35a and the negative high-voltage circuit 35c are in the on state at the same time. If the MPU 5 determines in S952 that there is a simultaneous on sequence, in which the secondary transfer positive high-voltage circuit 35b or the cleaning positive high-voltage circuit 35a and the negative high-voltage circuit 35c are in the on state at the same time, the process proceeds to S953. In S953, before executing the printing sequence, the MPU 5 turns on the secondary transfer positive high-voltage circuit 35b and the cleaning positive high-voltage circuit 35a, and performs the ATVC in S954. In S953, the MPU 5 turns off the negative high-voltage circuit 35c.

After the MPU 5 performs the ATVC in S954, current paths to the secondary transfer roller 144 are the paths 388 and 392 illustrated in FIG. 7B. As a result, the current detection circuit 35e can correctly detect the secondary transfer positive voltage having a positive polarity in the secondary transfer roller 144. Similarly, after the MPU 5 performs ATVC in S954, current paths to the cleaning brush 145 are the paths 389 and 393 illustrated in FIG. 7B. As a result, the current detection circuit 35d can correctly detect the cleaning positive voltage having a positive polarity flowing into the cleaning brush 145. In S955, the MPU 5 executes the printing sequence. In an operation for forming an image, during which the printing sequence is being executed, the secondary transfer positive voltage having a positive polarity and the cleaning positive voltage having a positive polarity are subjected to constant voltage control, for which results of the ATVC performed in S954, that is, results of the detection performed by the current detection circuits 35d and 35e, are used.

On the other hand, if the MPU 5 determines in S952 that there is no simultaneous on sequence, in which the secondary transfer positive high-voltage circuit 35b or the cleaning positive high-voltage circuit 35a and the negative high-voltage circuit 35c are in the on state at the same time, the process proceeds to S955. If the MPU 5 determines that there is no simultaneous on sequence of the secondary transfer positive high-voltage circuit 35b or the cleaning positive high-voltage circuit 35a and the negative high-voltage circuit 35c, the MPU 5 performs constant current control during the printing sequence as necessary.

Thus, this embodiment assumes a configuration at a time when the secondary transfer positive high-voltage circuit 35b or the cleaning positive high-voltage circuit 35a and the negative high-voltage circuit 35c are in the on state at the same time. According to this embodiment, even in such a case, a desired current can flow as the secondary transfer positive voltage having a positive polarity or the cleaning positive voltage having a positive polarity. As a result, by integrating a plurality of high-voltage circuits with one another, the number of high-voltage circuits can be decreased while maintaining the function of the image forming apparatus 100 of supplying high voltage, thereby reducing the high-voltage power supply device 3 in size.

It is to be noted that although a neutralizing power supply is integrated with another power supply in the first to fourth embodiments, a power supply to be integrated is not limited to the neutralizing power supply. Another power supply that outputs negative voltage may be integrated. For example, in order to prevent an offset phenomenon that can occur in the fusing unit 116, a fusing power supply that applies negative voltage, which has the same polarity as that of toner, to a fusing roller or the like may be integrated. In this case, also, by integrating a plurality of high-voltage circuits with one another, the number of high-voltage circuits can be decreased, thereby reducing the high-voltage power supply device 3 in size. As described above, according to this embodiment, the size and costs of the power supply device 3 can be reduced while maintaining the function of accurately detecting current.

While the present disclosure has been described with reference to exemplary embodiments, it is to be understood that these exemplary embodiments are to seen to be limiting. The scope of the following claims is to be accorded the broadest interpretation so as to encompass all such modifications and equivalent structures and functions.

This application claims the benefit of Japanese Patent Application No. 2014-058498, filed Mar. 20, 2014, which is hereby incorporated by reference herein in its entirety.

What is claimed is:

1. A power supply device that supplies voltage to a first member and a second member, comprising:
   a first circuit configured to generate a first voltage having a first polarity, the first voltage being applied to the first member;
   a second circuit connected to the first circuit configured to generate a second voltage having a second polarity which is opposite polarity of the first polarity, the second voltage being applied to the first member and second member;

a detection circuit configured to detect current flowing into the first member when the first voltage is applied to the first member from the first circuit; and a separation device configured to, in a case where the first voltage is applied to the first member from the first circuit, close current flowing from the second member to the first circuit through a path via which the first circuit and the second circuit are connected.

2. The power supply device according to claim 1, wherein the separation device is a diode.

3. The power supply device according to claim 1, wherein the separation device is a solid-state relay.

4. An image forming apparatus comprising:

an image bearing member on which a toner image is formed;

a transfer device configured to transfer the toner image formed on the image bearing member onto a recording material;

an electricity eliminating device configured to remove charge on the recording material that has passed through the transfer device to separate the recording material from the image bearing member;

a first circuit configured to generate a first voltage having a first polarity, the first voltage being applied to the transfer device to transfer a toner image onto the recording material;

a second circuit connected with the first circuit configured to generate a second voltage having a second polarity which is opposite polarity of the first polarity, the second voltage being applied to the transfer device and electricity eliminating device to remove charge on the recording material;

a first detection circuit configured to detect current flowing into the transfer device when the first voltage is applied to the transfer device from the first circuit; and a separation device configured to, in a case where the first voltage is applied to the transfer device from the first circuit, close current flowing to a circuit connected to the second circuit from the electricity eliminating device.

5. The image forming apparatus according to claim 4, further comprising:

a control device configured to control the voltage supplied to the transfer device from the first circuit, wherein, when an image is formed, the control device controls the first voltage applied to the transfer device from the first circuit based on a result of the detection performed by the first detection circuit.

6. The image forming apparatus according to claim 4, wherein, if, when the image is formed, the first circuit supplies the first voltage to the transfer device and the second circuit supplies the voltage to the electricity eliminating device, the control device stops the supply of the voltage to the electricity eliminating device from the second circuit and initiates the supply of the first voltage to the transfer device from the first circuit before the image is formed, and, when the image is formed, controls the first voltage supplied to the transfer device from the first circuit based on a result of detection of current flowing into the transfer device performed by the first detection circuit.

7. The image forming apparatus according to claim 4, wherein the separation device is a diode.

8. The image forming apparatus according to claim 4, wherein the separation device is a solid-state relay.

9. An image forming apparatus comprising:

a transfer device configured to transfer a toner image onto a recording material from an intermediate transfer member;

an electricity eliminating device configured to remove charge on the recording material that has passed through the transfer device;

a first circuit configured to generate a first voltage having a positive polarity, the first circuit being capable of applying the first voltage to the transfer device;

a second circuit connected with the first circuit and configured to generate a second voltage having a negative polarity, the second circuit being capable of applying the second voltage to both the transfer device and the electricity eliminating device;

a detection circuit configured to detect current flowing into the transfer device; and a diode disposed between the transfer device and the second circuit, wherein an anode side of the diode connects with the transfer device, and a cathode side of the diode connects with the electricity eliminating device.

10. The image forming apparatus according to claim 9, further comprising:

a control device configured to control the first voltage supplied to the transfer device from the first circuit, wherein, when an image is formed, the control device controls the first voltage supplied to the transfer device from the first circuit based on a result of the detection performed by the detection device.

11. The image forming apparatus according to claim 10, wherein, if, when the image is formed, the first circuit supplies the first voltage to the transfer device and the second circuit supplies the second voltage to the electricity eliminating device, the control device stops the supply of the second voltage to the electricity eliminating device from the second circuit and initiates the supply of the voltage to the transfer device from the first circuit before the image is formed, and, when the image is formed, controls the first voltage supplied to the transfer device from the first circuit based on a result of detection of current flowing into the transfer device performed by the detection device.

12. The power supply device according to claim 1, wherein the second member is an electricity eliminating device.

13. The power supply device according to claim 12, wherein the first member is a transfer device.

14. The power supply device according to claim 12, wherein the first member is a cleaning device.

15. The image forming apparatus according to claim 4, wherein, in a case where the first voltage is applied to the transfer device from the first circuit, the separation device closes current flowing to the first circuit connected to the second circuit from the electricity eliminating device.

16. The image forming apparatus according to claim 4, further comprising:

a photosensitive drum on which a toner image is formed, wherein the image bearing member is an intermediate transfer member, and the toner image formed on the photosensitive drum is transferred onto the intermediate transfer member and is thereafter transferred from the intermediate transfer member onto the recording material;

a third circuit connected to the second circuit configured to generate a third voltage having the first polarity;

a cleaning device configured to remove toner left on the intermediate transfer member after the transfer has been performed by the transfer device, voltage being applied to the cleaning device from the second circuit and the third circuit; and a second detection circuit configured to detect current flowing into the cleaning device, wherein, in a case where the first voltage is applied to the transfer device from the first circuit, the separation device closes current flowing to the third circuit connected to the second circuit from the electricity eliminating device.

17. The image forming apparatus according to claim 16, further comprising:

a control device configured to control the voltage supplied to the cleaning device from the third circuit, wherein, when the image is formed, the control device controls the voltage supplied to the cleaning device from the third circuit based on a result of the detection performed by the second detection circuit.

18. An image forming apparatus comprising:

an image bearing member on which a toner image is formed;

a transfer device configured to transfer the toner image formed on the image bearing member onto a recording material;

an electricity eliminating device configured to remove charge on the recording material that has passed through the transfer device to separate the recording material from the image bearing member;

a first circuit configured to generate a first voltage having a first polarity, the first voltage being applied to the transfer device to transfer a toner image onto the recording material; and a second circuit connected to the first circuit configured to generate a second voltage having a second polarity which is opposite polarity of the first polarity, the second voltage being applied to the transfer device and electricity eliminating device to remove charge on the recording material.

19. The image forming apparatus according to claim 18, further comprising:

a detection circuit configured to detect current flowing into the transfer device when the first voltage is applied to the transfer device from the first circuit.

20. The image forming apparatus according to claim 19, further comprising:

a control device configured to control the first voltage applied to the transfer device from the first circuit, wherein, when an image is formed, the control device controls the first voltage applied to the transfer device from the first circuit based on a result of the detection performed by the detection circuit.

21. The image forming apparatus according to claim 19, wherein, if, when the image is formed, the first circuit supplies the first voltage to the transfer device and the second circuit supplies the second voltage to the electricity eliminating device, the control device stops the supply of the second voltage to the electricity eliminating device from the second circuit and initiates the supply of the first voltage to the transfer device from the first circuit before the image is formed, and, when the image is formed, controls the first voltage supplied to the transfer device from the first circuit based on a result of detection of current flowing into the transfer device performed by the detection circuit.

22. The image forming apparatus according to claim 18, further comprising:

a photosensitive drum on which a toner image is formed, wherein the image bearing member is an intermediate transfer member, and the toner image formed on the photosensitive drum is transferred onto the intermediate transfer member and is thereafter transferred from the intermediate transfer member onto the recording material;

a third circuit connected to the second circuit configured to generate a third voltage having the first polarity; and a cleaning device configured to remove toner left on the intermediate transfer member after the transfer has been performed by the transfer device, wherein the cleaning device is supplied with the voltage generated by the second circuit and the third circuit.

* * * * *